US011100396B2

(12) United States Patent
Ozcan et al.

(10) Patent No.: US 11,100,396 B2
(45) Date of Patent: Aug. 24, 2021

(54) SELF-ADJUSTING THRESHOLD FOR SYNAPTIC ACTIVITY IN NEURAL NETWORKS

(71) Applicant: INTERNATIONAL BUSINESS MACHINES CORPORATION, Armonk, NY (US)

(72) Inventors: Ahmet S. Ozcan, San Jose, CA (US); J. Campbell Scott, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 925 days.

(21) Appl. No.: 15/685,152

(22) Filed: Aug. 24, 2017

(65) Prior Publication Data
US 2019/0065955 A1    Feb. 28, 2019

(51) Int. Cl.
*G06N 3/08* (2006.01)
*G06N 3/04* (2006.01)
*G06N 3/063* (2006.01)

(52) U.S. Cl.
CPC .......... *G06N 3/082* (2013.01); *G06N 3/0481* (2013.01); *G06N 3/063* (2013.01); *G06N 3/088* (2013.01)

(58) Field of Classification Search
None
See application file for complete search history.

(56) References Cited

U.S. PATENT DOCUMENTS

| | | | |
|---|---|---|---|
| 7,739,208 B2 | 6/2010 | George et al. | |
| 7,937,342 B2 | 5/2011 | George et al. | |
| 9,183,493 B2 | 11/2015 | Richert et al. | |
| 9,311,594 B1 | 4/2016 | Fisher et al. | |
| 2013/0159232 A1* | 6/2013 | Rhodes | G06N 3/063 706/27 |
| 2016/0328646 A1 | 11/2016 | Lin et al. | |
| 2018/0121802 A1* | 5/2018 | Ruckauer | G06N 3/08 |
| 2018/0174039 A1* | 6/2018 | Davies | G06N 3/049 |
| 2019/0122110 A1* | 4/2019 | Ruckauer | G06N 3/04 |

OTHER PUBLICATIONS

Kirillov et al., Information processing in neural networks with the complex dynamic thresholds, AIP Conference Proceedings 1738, 210006 (2016); https://doi.org/10.1063/1.4951989, Published Online: Jun. 23, 2016, Total pp. 5 (Year: 2016).*

(Continued)

*Primary Examiner* — Alan Chen
(74) *Attorney, Agent, or Firm* — Erik Huestis; Stephen Kenny; Foley Hoag LLP

(57) ABSTRACT

Self-adjusting thresholds for synaptic activity in neural networks are provided. In various embodiments, for each of a plurality of neurons within an artificial neural network, an overlap value is determined corresponding to active inputs connected to the neuron via synapses having non-zero synaptic weights. A count of those of the plurality of neurons whose overlap exceeds an activation threshold of the neural network is determined. The count is compared to a predetermined neuronal activity target. The activation threshold of the neural network is adjusted to approach the predetermined neuronal activity target.

24 Claims, 5 Drawing Sheets

(56) References Cited

OTHER PUBLICATIONS

Carrillo-Medina et al., Implementing Signature Neural Networks with Spiking Neurons, Frontiers in Computational Neuroscience, vol. 10, Article 132, pp. 1-17 (Year: 2016).*

Geva et al., "A dynamic threshold neural network for modeling interference in a sequence of associative memories," IEEE International Conference on Systems, Man and Cybernetics. Information Intelligence and Systems (1996).

International Search Report and Written Opinion for International Application No. PCT/EP2018/068289 dated Oct. 10, 2018.

Liu et al., "Homeostasis in a silicon integrate and fire neuron," Advances in Neural Information Processing Systems, 13:1-7 (2001).

Strain et al., "An STDP Training Algorithm for a Spiking Neural Network With Dynamic Threshold Neurons," Int J Neural Sys, 20(6):463-480 (2010).

Hawkins et al. "Sequence memory for prediction, inference and behaviour," Phil. Trans. R. Soc. B (2009) 364, 1203-1209 doi:10.1098/rstb.2008.0322.

Sala et al., "Self-Organization in Networks of Spiking Neurons," (1998) University of Toledo and Medical College of Ohio.

Siemens et al., "A supervised learning approach for Weighted Parameter Estimation Model using combinatorial neural network framework," (2010) Siemens AG.

"Fast Simulation with Multiple Multi-Layer Neural Networks" (2016).

D. E. Rumelhart, G. E. Hinton & R. J. Williams, "Learning representations by back-propagating errors," Nature 323, 533-536 (1986).

R. Rojas, Neural Networks, Springer-Verlag, Berlin, 1996.

J. Hawkins, & S. Blakeslee, 2004 On Intelligence. Times Books, New York, NY.

E. L. Bienenstock, L. N. Cooper & P. W. Munro, "Theory for the development of neuron selectivity: orientation specificity and binocular interaction in visual cortex," J Neurosci, 2, 32-48, (1982).

* cited by examiner

SELF-ADJUSTING THRESHOLD FOR SYNAPTIC ACTIVITY IN NEURAL NETWORKS

This invention was made with Government support under contract number N66001-15-C-4034 awarded by the Defense Advanced Research Projects Agency (DARPA) and the Space and Naval Warfare Systems Center Pacific (SSC Pacific). The Government has certain rights to this invention.

BACKGROUND

Embodiments of the present disclosure relate to artificial neural networks, and more specifically, to self-adjusting thresholds for neuronal activity in neural networks.

BRIEF SUMMARY

According to embodiments of the present disclosure, methods of and computer program products for self-adjusting a neural network are provided. In various embodiments, for each of a plurality of neurons within an artificial neural network, an overlap value is determined corresponding to active inputs connected to the neuron via synapses having non-zero synaptic weights. A count of those of the plurality of neurons whose overlap exceeds an activation threshold of the neural network is determined. The count is compared to a predetermined neuronal activity target. The activation threshold of the neural network is adjusted to approach the predetermined neuronal activity target.

DETAILED DESCRIPTION

Figure 1:
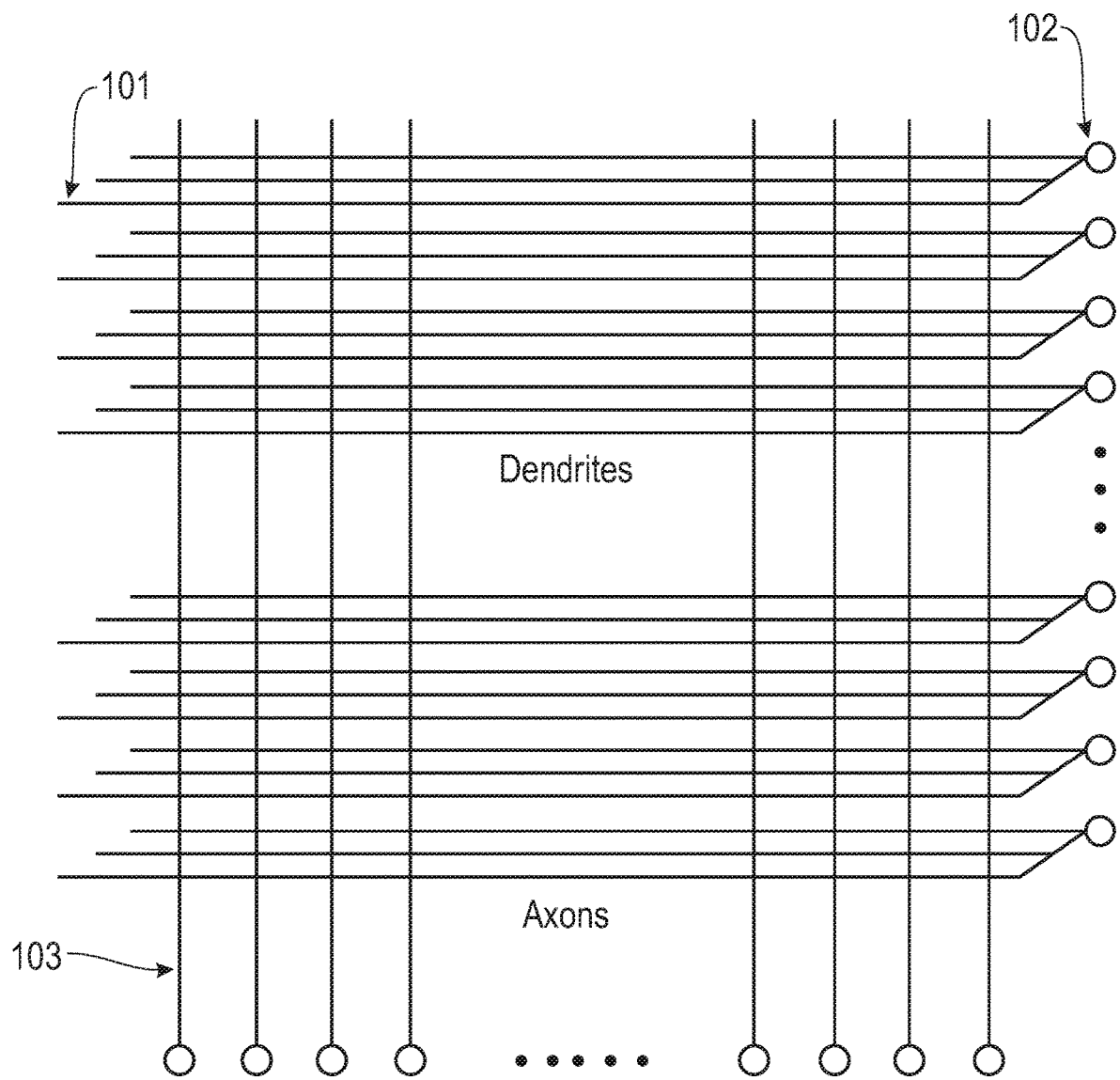
FIG. 1 illustrates an exemplary synapse array according to embodiments of the present disclosure.

Artificial neural networks (ANNs) are distributed computing systems, which consist of a number of neurons interconnected through connection points called synapses. Each synapse encodes the strength of the connection between the output of one neuron and the input of another. The output of each neuron is determined by the aggregate input received from other neurons that are connected to it. Thus, the output of a given neuron is based on the outputs of connected neurons and the strength of the connections as determined by the synaptic weights. An ANN is generally trained to solve a specific problem (e.g., pattern recognition) by adjusting the weights of the synapses such that a particular class of inputs produce a desired output.

Various algorithms may be used for this learning process. Certain algorithms may be suitable for specific tasks such as image recognition, speech recognition, or language processing. Training algorithms lead to a pattern of synaptic weights that, during the learning process, converges toward an optimal solution of the given problem. Backpropagation is one suitable algorithm for supervised learning, in which a known correct output is available during the learning process. The goal of such learning is to obtain a system that generalizes to data that were not available during training.

In general, during backpropagation, the output of the network is compared to the known correct output. An error value is calculated for each of the neurons in the output layer. The error values are propagated backwards, starting from the output layer, to determine an error value associated with each neuron. The error values correspond to each neuron's contribution to the network output. The error values are then used to update the weights. By incremental correction in this way, the network output is adjusted to conform to the training data.

Artificial neural networks (ANNs) have been increasingly successful in addressing problems in artificial intelligence, particularly those that require large amounts of data and long times to process. As described above, the basic operation of each node or neuron in the network is to compute the weighted sum of inputs from other nodes, and if that sum exceeds a given threshold to fire, the neuron is activated. Weights are associated with the synaptic connections between each pair of neurons.

In some neural networks, a sharp threshold (the Heaviside step function) is replaced by a non-linear "squashing" function such as hyperbolic tangent, or the logistic function. This makes the neuron response a differentiable function of each input and allows the application of back-propagation, in which errors are fed backwards through the network and used to adjust the synaptic weights, in order, iteratively, to minimize the output errors of the network. However, these mathematical improvements take ANNs further from the biological operation of the brain that was the original inspiration for the design of neural networks.

In these ANNs, the synaptic weights are real numbers that must be adjusted in the learning process to minimize errors. This is contrary to the operation of real brains, which have synapses whose weights varies randomly due to biological processes. In addition, these ANNs require many labeled samples on which to learn, and the accuracy of learning (as measured in subsequent tests) depends on the nature of the sample data. In addition, an ANN has a limited ability to generalize. If there was no example in the training set very similar to a test example, the likelihood of error is very high. Precision and generalization are in tension.

For these reasons, systems are desirable that are resistant to noise, such as random errors in the input data, occasional disconnected synapses, or neurons that do not fire. An example of such a system is one in which the synaptic weight is binary, whether truly binary (0 or 1) or bipolar (−1 or +1). In such binary neural networks (BNNs) the activation of each neuron depends, as described above, on the weighted sum of its inputs. Since the pre-synaptic neurons either fire or not, and the weights are either zero or one, the sum is an integer which again must be compared to a (Heaviside) threshold to determine whether the post-synaptic neuron is activated or not.

An additional feature of these types of networks is that they can be designed and trained in such a way that they learn without requiring that the data be labeled. This may involve the use of time dependent datasets, in which each event in the series depends in some way upon the events that have preceded it. In these cases, the ANN system can learn to predict the next event based on past history. If the prediction is confirmed, the synaptic weights that led to the correct prediction are increased. If the prediction is not confirmed the synaptic weights are reduced. In this way, learning occurs without the need for labeled data.

A subclass of BNNs employs sparse distributed representations (SDRs) of the input, intermediate, and output data. These are large binary arrays, typically vectors, with very few elements on (e.g., with value of 1), the remainder are off (e.g., with a value of 0). An example of such a system is a Hierarchical Temporal Memory (HTM). Feed-forward algorithms for HTM involve a thresholding step in which a sum of coincident bits is compared to a fixed threshold value. Without prior knowledge of the input data-stream, it is very difficult to set this threshold in a manner which makes optimal use of computer resources. As a result, methods may be applied to ensure that all elements of the network are active for at least a small fraction of the input data. These methods require considerable additional processing time, the storage of more data, and the setting, by the user, of additional parameters.

The present disclosure provides methods that avoid the need to predetermine the threshold and moreover tend to ensure broad use of the elements of the network. The resulting algorithms have fewer parameters to be set by the network designer.

ANNs which learn to minimize errors through backpropagation include a bias input to each node. This plays a similar role as an adjustable threshold. However, its adjustment is made on the basis of error minimization rather than neural activity.

Referring to FIG. 1, an exemplary synapse array is illustrated. The dendrites (horizontal lines 101), here 3 segments per neuron (circles 102), potentially form synaptic connections with the axons (vertical lines 103). In a pooler/correlator, e.g., of an HTM, the axons derive from neurons in regions lower in the hierarchy. In sequence memory, the axons come from the same set of cells as the inputs, i.e., the connections are lateral. For feedback, the axons derive from neurons in regions higher in the hierarchy.

The present disclosure provides for the use of floating thresholds, rather than the fixed threshold described above, in the context of binary neural networks. In an HTM, for example, a desired activity level may be predetermined, corresponding to the fraction of synapses and neurons that should be active at any given time. According to the present disclosure, the threshold is adjusted such that this level of activity is achieved. One benefit of this approach is the occasional activating and strengthening of little used synapses, without recourse to individualized solutions that require additional parameters.

There are several places in the architecture of HTM and similar networks and in their learning algorithms where a sum of neural activity is compared to a threshold, for example, in a pooler, in the sequence memory, and in the synaptic arrays (such as in FIG. 1) that receive feedback from levels higher in the hierarchy.

A pooler's function is to correlate the activity of axons—the input to the array of synapses. This activity may be represented as a set of bits (e.g., 1s in a binary vector) at each time-step of the data-stream. In addition, the pooler reduces the dimensionality such that the output vector has fewer bits than the input vector. In the pooler, axons from input neurons connect with a subset of the output neurons through multiple synapses on basal (or proximal) dendrites of the latter. For each dendrite, the coincidence of active axons with connected synapses is summed (this sum may be termed the overlap) and if the overlap exceeds the threshold value, the output neuron is activated. As noted above, the threshold may be chosen ahead of time during the design or setup of the network. If chosen in advance, the threshold must be low enough that the desired activity of output neurons is achieved.

However, depending on the statistics of the data-stream, some dendrites may never reach threshold and so their neurons are never activated. Because of the rules of Hebbian synapse update, this lack of activity, in turn, makes it even less likely that the neurons in question will become active in the future, because synapse strengthening and connection depends on firing of the receiving neuron.

One approach to this issue is to keep track of the recent activity of all neurons, and to boost the overlap sum of those that show little recent activity. This approach requires additional parameters to determine what constitutes recent, for example, to determine how many time-steps to track activity and to determine by how much to boost the overlap. The boost method also requires additional memory to store the time-averaged activity of each neuron.

Another approach of ensuring some level of activity in all neurons is to track the time average of the overlap in each dendrite. If the average overlap falls too far, all the synapses on that dendrite are increased. Again, this requires several additional parameters and a memory array for the average overlap of each dendrite.

In comparison to the above two approaches, the present disclosure provides a more efficient means to ensure widespread neuronal activity. The methods described herein require fewer adjustable parameters and less memory. The computational complexity is comparable to alternative methods.

Figure 2:
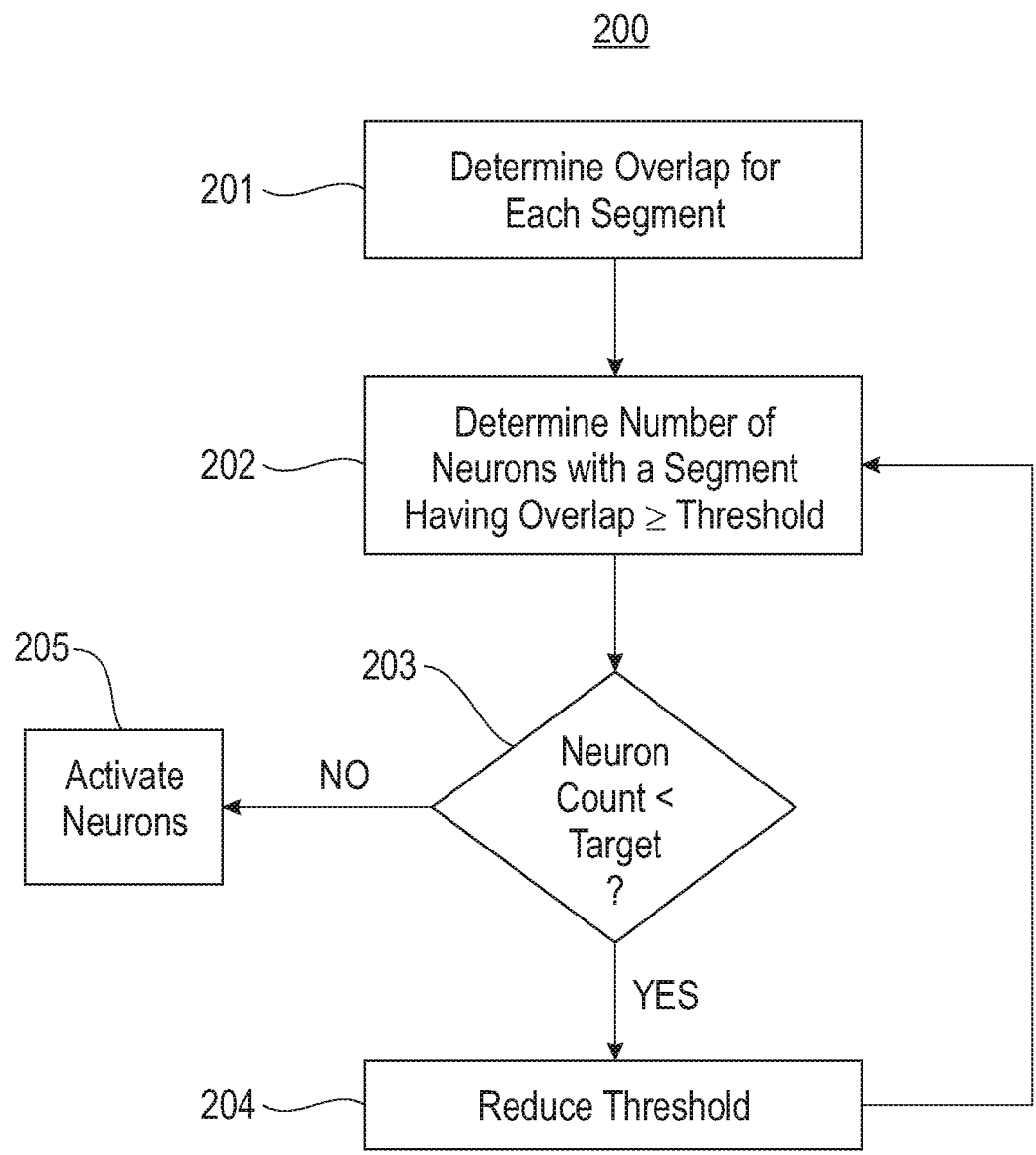
FIG. 2 illustrates a method of dynamically adjusting a synaptic activity threshold according to embodiments of the present disclosure.

Referring to FIG. 2, a method of dynamic threshold adjustment is illustrated according to embodiments of the present disclosure. At 201, the maximum overlap for all the dendrite segments of the synapse array is determined. This provides an initial value for the floating threshold. At 202, the number of neurons with at least one segment having overlap equal to or greater than the threshold is determined. For the initial value, there are 0 segments greater. At 203, the number of such segments is compared to the desired output neuron activity. If the number is less than the desired output neuron activity, the threshold is reduced by a predetermined value (e.g., 1) at 204 and the process returns to 202.

In some instances, the number of active neurons at 203 may be greater than the desired activity. In such cases, neurons may be selected for activation. In one selection methodology, neurons are chosen at random from among those with segments having overlap now equal to the set threshold (random selection) in order to achieve the desired neuronal activity. In another selection methodology, all segments with overlap now equal to the set threshold are included (permissive selection), resulting in neuron activity higher than the desired level. In another selection methodology, no segments with overlap now equal to the set threshold are included (strict selection), resulting in neuron activity lower than the desired level.

The choice among these selection methodologies may be made based on the function of a given synaptic array. For example, if the learning of new associations is desired, it is appropriate to select at random or even permissively. In contrast, if the most accurate result is required for classification or accurate reconstruction of a prediction after initial training, then strict selection is more appropriate.

The methods described above ensure that input axons that are only occasionally active will eventually cause activity in correspondingly rarely active neurons. This avoids the necessity of boosting as described above. Moreover, by introducing a floating threshold, it becomes unnecessary to track and enhance the time-average overlap duty by non-Hebbian synapse strengthening.

These methods are applicable whether or not the synapses are driving (in the sense that the connected axons cause immediate firing in the output neurons) or modulating (affecting the neural response to the next driving input as in long-term potentiation).

Synapse update follows the above steps, for example using Hebb's rules. In particular, if active input axons are connected to active output neurons, the corresponding synapses are strengthened. If inactive axons are connected to active outputs, the synapses are weakened. If active axons are connected to inactive outputs, the synapses are weakened. In this way, input axons that are often simultaneously active are connected to the same output neuron(s), and those that are rarely active together end up connected to different outputs.

In this way, a pooler acts to correlate two more input data streams. Sequence memory via LTP (long-term potentiation) learns to identify sequences that have been seen previously and to predict the input at the coming time steps. The dendrites that receive feedback learn appropriate responses to activity in upper levels of the hierarchy.

In a correlator the sum and threshold operation is performed on the basal, driving dendrites. For a direct comparison with biology, it is helpful to think of these as the inputs to the layer-4 (L4) neurons which in the real cortex process the signals arriving from other cortical regions or from the thalamus. They provide bottom-up driving inputs to the neurons of the mini-columns in layer 2/3.

Sequence memory corresponds to L2/3. Here, the sum is performed on lateral (distal) dendrite segments of neurons in the mini-columns. The connecting axons derive from other cells in other nearby mini-columns. In this case, segment activity is modulating in the sense that it does not cause the immediate firing of its neuron, but rather determines which among the many neurons of the mini-column will fire in response to the next basal input from L4. The floating threshold as described herein may be applied to lateral overlap in order to make the desired number of predictions. If the prediction is verified by the next input, the synapses responsible for the correctly predicted mini-columns are strengthened.

The floating threshold as described herein is also applicable in the apical dendrites, which receive top-down feedback in the hierarchical network. This input can be used, for example, to overcome noise or missing data in the input data stream.

Figure 3:
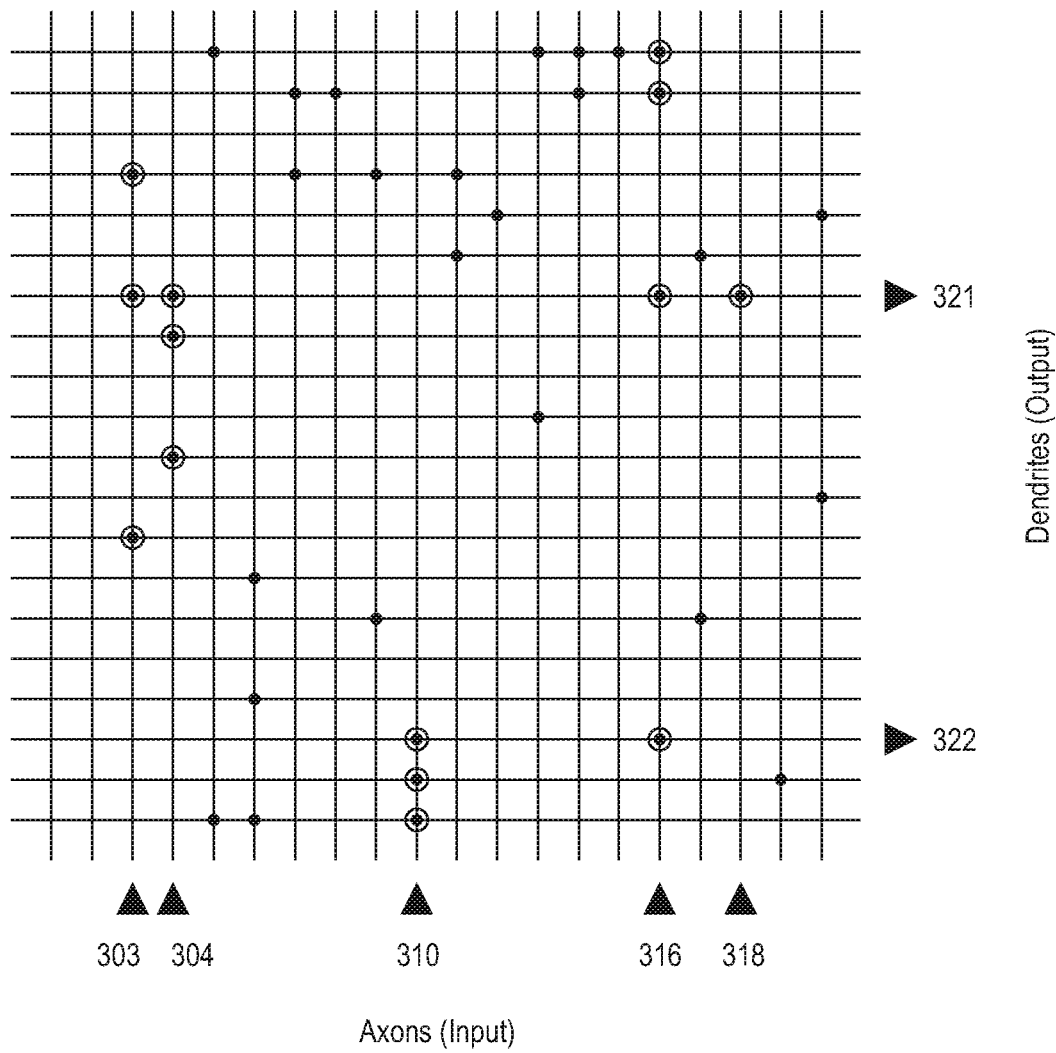
FIG. 3 is a schematic of threshold operation according to embodiments of the present disclosure.

Referring now to FIG. 3, a threshold operation according to the present disclosure is illustrated. The solid dots show where axons (vertical lines) connect via a synapse to a dendrite (horizontal lines). Where the lines cross with no dot, there is no synaptic connection. In this example, axons numbered 303, 304, 310, 316, and 318 are active. The open circles show the connected synapses on these active axons. The dendrite 321 has the most synapses that are both active and connected. The overlap is 4. Thus, 4 is the initial value of the adjustable threshold. If more than one active dendrite is desired, the threshold is lowered stepwise as described above. A threshold of 3 activates no additional dendrites. A threshold of 2 activates dendrite number 322, which has an overlap of 2. If two active dendrites are desired the procedure terminates, and the neurons to which dendrites 321 and 322 connect are activated.

Figure 4:
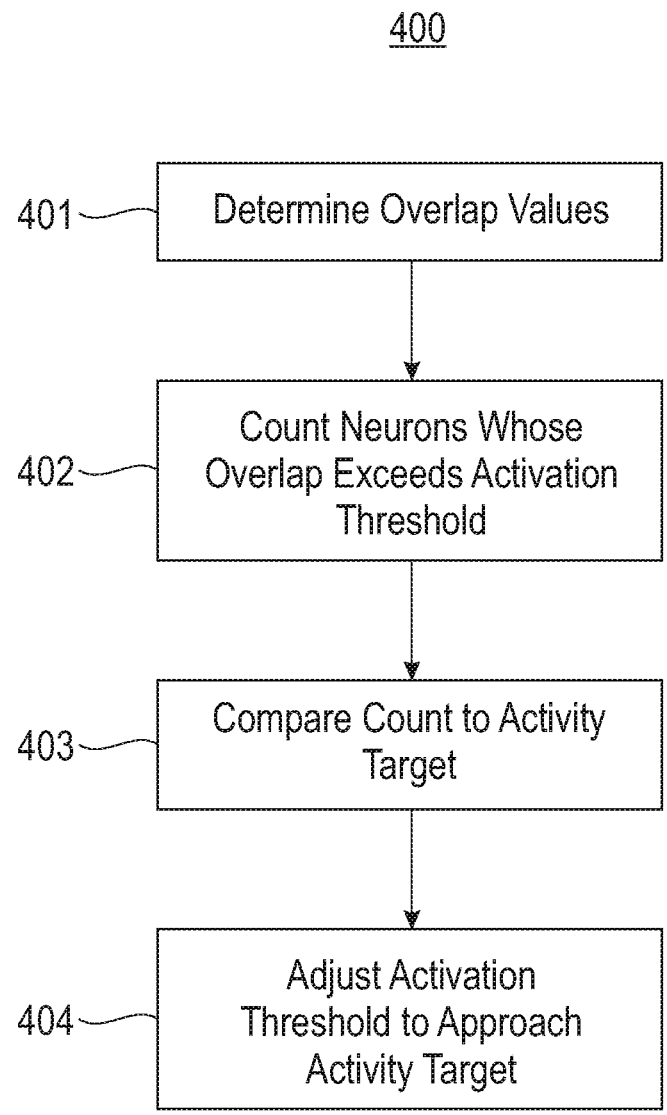
FIG. 4 illustrates a method of self-adjusting a neural network according to embodiments of the present disclosure.

Referring to FIG. 4, a method for self-adjusting a neural network is illustrated according to embodiments of the present disclosure. At 401, for each of a plurality of neurons within an artificial neural network, an overlap value is determined corresponding to active inputs connected to an output of the neuron via synapses having non-zero synaptic weights. At 402, a count of those of the plurality of neurons whose overlap exceeds an activation threshold of the neural network is determined. At 403, the count is compared to a predetermined neuronal activity target. At 404, the activation threshold of the neural network is adjusted to approach the predetermined neuronal activity target.

In some embodiments, adjusting the threshold comprises decrementing the threshold when the count is less than the predetermined neuronal activity target. In some embodiments, the initial threshold is predetermined. In some embodiments, determining the overlap value comprises applying synaptic weights to the inputs. In some such embodiments, the synaptic weights are binary.

In some embodiments, each of the plurality of neurons is within one layer of the artificial neural network. In some embodiments, each of the plurality of neurons is within one spatial region of the artificial neural network.

In some embodiments, the neural network comprises a hierarchical temporal memory. In some embodiments, the predetermined neuronal activity target corresponds to about 10% or less of the plurality of neurons. In some embodiments, the active inputs correspond to a sparse distributed representation.

It will be appreciated that artificial neural networks as described herein may be deployed on one or more computing nodes. For example, a plurality of computing nodes may be connected via a bus or network, the plurality of computing nodes providing parallel processing of the various synaptic and neuron functions that combine to form the artificial neural network.

Figure 5:
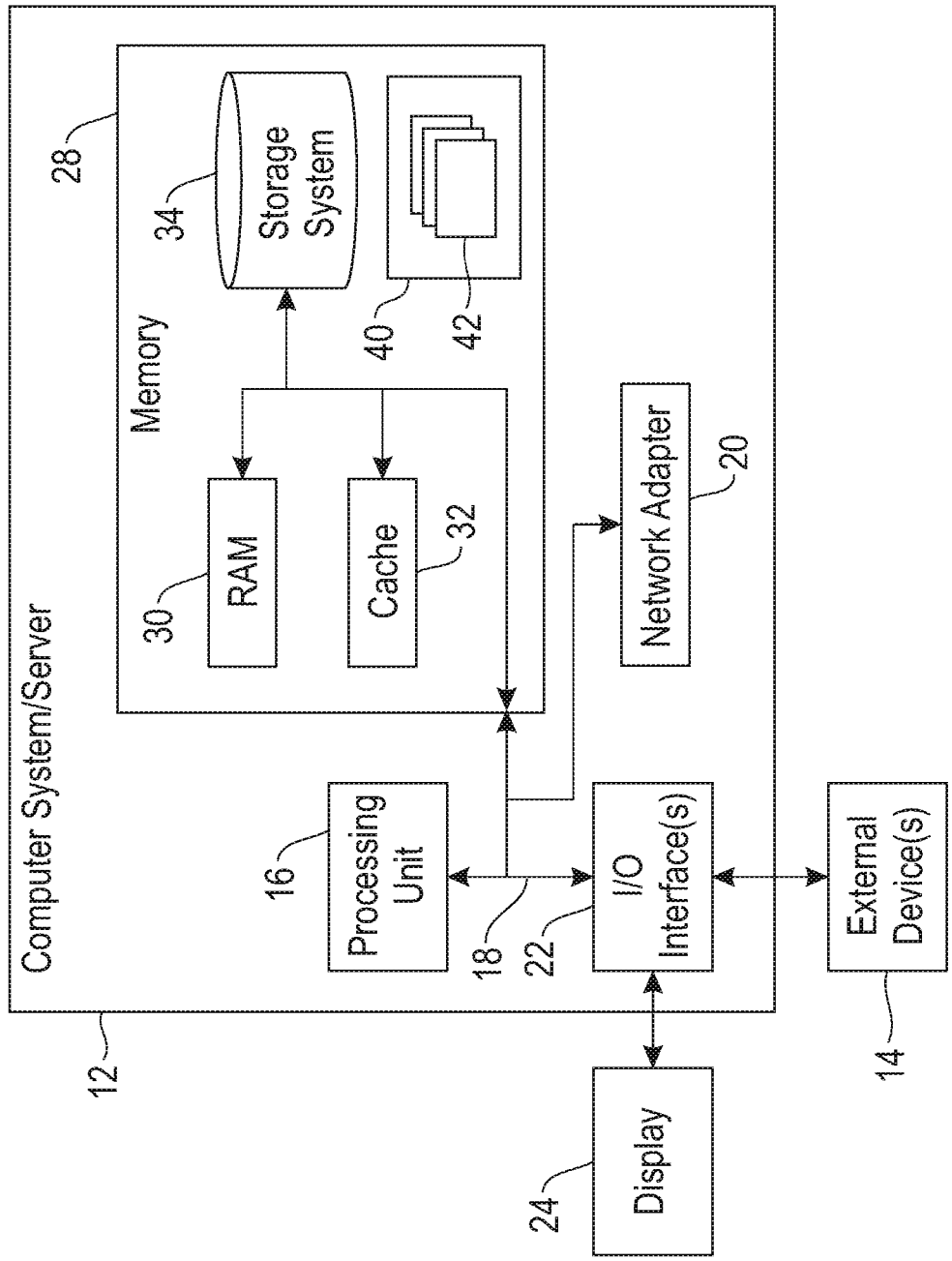
FIG. 5 depicts a computing node according to an embodiment of the present invention.

Referring now to FIG. 5, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive") or analogous non-volatile storage such as an SSD. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   determining an overlap value for each of a plurality of neurons within an artificial neural network, each overlap value defined by a number of active inputs connected to its associated neuron via synapses having non-zero synaptic weights;
   determining a count of neurons of the plurality of neurons whose overlap value exceeds an activation threshold of the neural network;
   comparing the count of neurons to a predetermined neuronal activity target; and
   adjusting the activation threshold of the neural network to achieve the predetermined neuronal activity target.

2. The method of claim 1, wherein adjusting the activation threshold comprises:
   decrementing the activation threshold when the count of neurons is less than the predetermined neuronal activity target.

3. The method of claim 1, wherein the activation threshold is predetermined.

4. The method of claim 1, wherein determining the overlap value comprises applying synaptic weights to the inputs.

5. The method of claim 4, wherein said applying the synaptic weights to the inputs comprises multiplication of the synaptic weights by the inputs and summation of the results thereof.

6. The method of claim 4, wherein the synaptic weights are binary.

7. The method of claim 1, wherein each of the plurality of neurons is within one layer of the artificial neural network.

8. The method of claim 1, wherein each of the plurality of neurons is within one spatial region of the artificial neural network.

9. The method of claim 1, wherein the neural network comprises a hierarchical temporal memory.

10. The method of claim 1, wherein the predetermined neuronal activity target corresponds to 10% or less of the plurality of neurons.

11. The method of claim 1, wherein the active inputs correspond to a sparse distributed representation.

12. A system, comprising:
   a computing node comprising a computer readable storage medium having program instructions embodied therewith, the program instructions executable by a processor of the computing node to cause the processor to perform a method comprising:
      determining an overlap value for each of a plurality of neurons within an artificial neural network, each overlap value defined by a number of active inputs connected to its associated neuron via synapses having non-zero synaptic weights;

determining a count of neurons of the plurality of neurons whose overlap value exceeds an activation threshold of the neural network;

comparing the count of neurons to a predetermined neuronal activity target; and adjusting the activation threshold of the neural network to achieve the predetermined neuronal activity target.

13. A computer program product for self-adjusting a neural network, the computer program product comprising a computer readable storage medium having program instructions embodied therewith, the program instructions executable by a processor to cause the processor to perform a method comprising:

determining an overlap value for each of a plurality of neurons within an artificial neural network, each overlap value defined by a number of active inputs connected to its associated neuron via synapses having non-zero synaptic weights;

determining a count of neurons of the plurality of neurons whose overlap value exceeds an activation threshold of the neural network;

comparing the count of neurons to a predetermined neuronal activity target; and adjusting the activation threshold of the neural network to achieve the predetermined neuronal activity target.

14. The computer program product of claim 13, wherein adjusting the activation threshold comprises:

decrementing the activation threshold when the count of neurons is less than the predetermined neuronal activity target.

15. The computer program product of claim 13, wherein determining the overlap value comprises applying synaptic weights to the inputs.

16. The computer program product of claim 15, wherein applying the synaptic weights to the inputs comprises multiplication of the synaptic weights by the inputs and summation of the results thereof.

17. The computer program product of claim 16, wherein the synaptic weights are binary.

18. The computer program product of claim 13, wherein each of the plurality of neurons is within one spatial region of the artificial neural network.

19. The computer program product of claim 13, wherein the neural network comprises a hierarchical temporal memory.

20. The computer program product of claim 13, wherein the predetermined neuronal activity target corresponds to 10% or less of the plurality of neurons.

21. The computer program product of claim 13, wherein the active inputs correspond to a sparse distributed representation.

22. An artificial neural network, comprising:

a plurality of neurons interconnected by a plurality of physical synapses, each synapse having an associated synaptic weight, the artificial neural network being configured to:

determine an overlap value for each of the plurality of neurons, each overlap value defined by a number of active inputs connected to its associates neuron via synapses having non-zero synaptic weights;

determine a count of neurons of the plurality of neurons whose overlap value exceeds an activation threshold of the neural network;

compare the count of neurons to a predetermined neuronal activity target; and adjust the activation threshold of the neural network to achieve the predetermined neuronal activity target.

23. The artificial neural network of claim 22, wherein adjusting the activation threshold comprises:

decrementing the activation threshold when the count is less than the predetermined neuronal activity target.

24. A method, comprising:

setting an initial activation threshold of an artificial neural network, the artificial neural network comprising a plurality of neurons interconnected by a plurality of synapses;

comparing neuronal activity within the artificial neural network to a predetermined neuronal activity target, wherein comparing neuronal activity comprises determining an overlap value for each of the plurality of neurons, each overlap value defined by a number of active inputs connected to its associated neuron via synapses having non-zero synaptic weights, and determining a count of neurons of the plurality of neurons whose overlap value exceeds the activation threshold; and decrementing the activation threshold until neuronal activity within the artificial neural network meets the predetermined neuronal activity target.

* * * * *